United States Patent Office 3,475,204
Patented Oct. 28, 1969

3,475,204
POLYESTER TIRE CORD LUBRICANT
Hugh Thomas Patterson, Greenville, N.C., assignor to E. I. du Pont de Nemours and Company, Wilmington, Del., a corporation of Delaware
No Drawing. Filed Sept. 18, 1967, Ser. No. 668,700
Int. Cl. B44d 1/22; C08f 45/50
U.S. Cl. 117—138.8    1 Claim

ABSTRACT OF THE DISCLOSURE

Interfilament polyester tire cord lubrication is provided by a mixture of solid and liquid lubricants. The solid lubricant is either a Group II metal or aluminum salt of a 12 to 24 carbon atom saturated fatty acid, or an alkyl partial ester of a Group II metal salt of orthophosphoric acid. The liquid lubricant is a lower alkyl- or aryl-substituted organopolysiloxane.

BACKGROUND OF THE INVENTION

Field of the invention

This invention relates to oiled structures of linear polyesters and more particularly to polyester tire cords having both solid and liquid lubricants on their surfaces.

Description of the prior art

The technological advancement of the use of polyester cords for reinforcing elastomeric structures such as pneumatic tires is now recognized. The major advantage of polyester cord reinforced pneumatic tires over polyamide cord reinforced tires is their outstanding resistance to "flat-spotting." This advantage has kindled the interest of manufacturers, and industrial application of such structures has profoundly increased over the years.

A natural phenomenon occurring in all matter to some extent, which is particularly acute in materials exposed to conditions of hard wear, is gradual physical breakdown, commonly called "fatigue." Vehicle tires and the like, which in normal use are exposed to extremely adverse conditions such as extremities of weather, frequent impact, and constant grueling stresses and flexes are prone to early failure which, in many instances, is the result of fatigue. Components are carefully selected to provide commercially feasible lifetimes for such structures and it is recognized that a very critical component for this end is the reinforcing cord. Accordingly, researchers have directed their efforts to determine the causes of cord fatigue in order to develop low-fatigue cords.

It has recently been discovered that fatigue in cords which are subject to hard wear bears a very significant relationship to interfilament friction in the cord. Utilization of this technology has led manufacturers to coat their filaments heavily with lubricants and, as was predicted, fatigue values have improved. The use of effective lubricants on polyester cords, however, has been attendant with other technical difficulties resulting from good filament lubricity, the most serious of which is the lowering of cord to elastomer adhesion which leads eventually to rupture of the elastomer. The lubricants of the art invariably lessen the effectiveness of adhesives in their function of providing strong bonds between the components. This drawback was considered insuperable; and manufacturers, cognizant of the aforementioned advantages of polyester cord reinforced structures, reluctantly sought a compromise between the extremes of good fatigue values with poor adhesion and poor fatigue values with good adhesion.

This invention solves these problems with a lubricated polyester cord with low interfilament friction which can be securely bonded to elastomeric structures by means of conventional adhesives and processing techniques. The lubricated polyester cord of this invention shows little fatigue in hard wear.

SUMMARY OF THE INVENTION

The invention resides in a linear polyester filament coated with from 0.3% to 10%, preferably about 1.2%, of a lubricant which comprises (a) a linear organopolysiloxane in which each of the silicon substituents are selected from the group consisting of lower alkyl and aryl, and (b) finely divided particles of from 0.4 to 40 microns in diameter comprising from 1% to 25% by weight of the lubricant selected from the group consisting of (i) a magnesium, calcium, zinc, strontium, cadmium, barium or aluminum salt of a saturated fatty acid having from 12 to 24 carbon atoms, and (ii) a partial ester of orthophosphoric acid of the formula:

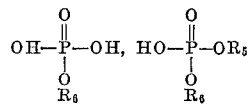

or mixture thereof, wherein $R_5$ and $R_6$ are each selected from the group consisting of alkyls having from 8 to 18 carbon atoms and wherein the hydrogen atoms are replaced by magnesium, calcium, zinc, strontium, cadmium or barium.

The preferable silicon substituents are methyl and phenyl. The preferable particulate lubricants are magnesium and aluminum stearate or an equimolar mixture of calcium mono-n-octyl phosphate and calcium di-n-octyl phosphate, although excellent results are obtained with calcium dioctyl phosphate.

DEFINITIONS AND STANDARDS

Three quantitative determinations are used to measure the important properties of the product of this invention and to compare the new products with products of the prior art. These measurements are adhesion, fatigue and friction.

*Adhesion measurement for fabric.*—Adhesion is measured in the following manner. A 250-denier/50-filament polyester yarn bundle twisted 4.2 turns/inch is woven into a 4-oz./yd.² sailcloth fabric of 54 warp ends per inch by 64 picks per inch. The fabric is dipped into a mixture comprising 98.4% by weight of carbon tetrachloride and 1.6% by weight of lubricant. The carbon tetrachloride is allowed to evaporate and approximately 1% by weight of lubricant remains on the fabric.

An aqueous adhesive composition comprising 3 parts by weight of phenol-blocked methylene-bis-(4-phenyl isocyanate) and 1 part by weight of a commercially available glycidyl polyether from glycerol and epichlorohydrin as taught in United States Patent 2,902,395, is prepared.

The adhesive composition is applied to the oiled fabric at a level of 0.8% by weight. The fabric is then heated for 2 minutes at 200° C. The fabric is then dipped into a resorcinol/formaldehyde/latex (hereafter RFL) composition. The RFL composition is prepared by mixing 98.3 parts by weight of water; 49 parts by weight of resorcinol; 26.6 parts by weight of a 37% aqueous formaldehyde solution; and 288 parts by weight of a composition comprising 41% solids butadiene/styrene/vinylpyridine (70/15/15) copolymer latex, and aging for 4 days. The fabric containing approximately 5.3% RFL is heated at 200° C. for 2 minutes.

The fabric is then pressed between 2 sheets of

.0625-inch thick elastomer stock of the following composition:

|  | Parts by weight |
|---|---|
| Natural rubber, smoked sheet | 50 |
| Styrene/butadiene rubber (polymerized in the cold) | 50 |
| Stearic acid | 1 |
| Zinc oxide | 3 |
| H-A-F Black (trademark for a high abrasion carbon black used as a reinforcing agent) | 35 |
| Circosol-2-XH (trademark for a processed petroleum hydrocarbon oil used as a softener for synthetic rubber) | 10 |
| Age Rite Resin D (trademark for polymerized trimethyldihydroquinoline curing agent) | 1 |
| N-Oxydiethylenebenzothiazole-2-sulfenamide | 1.25 |
| Benzothiazyl disulfide accelerator | 0.25 |
| Sulfur | 2.5 |
| Total | 154.00 |

Pressing conditions are 150 p.s.i. at 157° C. for 30 minutes. The structure comprises the cloth sandwiched between right-hand and left-hand elastomer strips. A small section of the left hand elastomer strip is peeled from the cloth (this is most conveniently done by placing a thin strip of polyethylene terephthalate film between an end section of the cloth and the end section of the left hand strip prior to pressing). The exposed section of the cloth from which the rubber was stripped and which is adherent to the right hand strip is then placed in the upper jaw of a commercial Instron tester. The loose part of the left hand strip is placed in the lower jaw of the instrument and an aluminum plate is placed against the right hand strip to prevent the structure from bending appreciably. The structure is then heated to 145° C. to simulate severe cord-use conditions and the left hand strip is slowly peeled from the cloth in a direction opposite to the holding force applied by the upper clamp, by applying force to the lower jaw of the instrument. Adhesion is recorded in pounds/inch fabric width.

*Single end strip adhesion (SESA) measurement.*—A 940-denier/192-filament polyester yarn bundle is treated with 1.2% of lubricant and twisted to 12 S turns/inch and 2 ends of this are plied and twisted to 12 Z turns/inch.

An aqueous adhesive composition comprisng 3 parts by weight of phenol-blocked methylene-bis-(4-phenyl isocyanate) and 1 part by weight of a commercially available glycidyl polyether (from glycerol and epichlorohydrin, as taught in U.S. Patent 2,902,398 at col. 4, lines 1-24), is prepared.

The lubricated, twisted polyester cord is dipped in an aqueous mixture of the adhesive and heated in an oven for 60 seconds at 218° C. under an applied stretch of 3% to give a precoated cord having dried coating pickup of about 1.5% by weight.

An overlay coating (RFL) is prepared by mixing resorcinol, formaldehyde, water and a 41% dispersion of butadiene/styrene/vinylpyridine (70/15/15) terpolymer latex and aging the mixture for 4 days at room temperature. The overlay is applied to the precoated cord which is then cured at 218° C. for 60 seconds with an applied stretch of 3%. Usually the dried solids pickup in this step is approximately 6% by weight based on the weight of the original cord.

Lengths of adhesive-treated, lubricated cord are placed in the bottom of a steel mold, the cords being parallel and spaced 0.5 inch apart. The cords are placed under dead-weight tension to maintain their position. A sheet of unvulcanized compounded elastomer stock 0.125 inch thick is placed over the cords, covered with a cotton duck reinforcing backing, and the top plate of the mold placed over the backing. The mold is put into a platen press. A pressure of approximately 120 p.s.i. is applied and the mold is heated to about 150° C. for 60 minutes. Other vulcanizing conditions appropriate for the individual elastomer composition may be used. The specimen is cooled and subsequently removed from the press. The cords are now firmly embedded in the cured elastomer stock but are visible on the surface. This sheet is cut into strips of 0.5 inch width, each having a cord in the center of its width. The cord end is separated from one end of the strip; the free end of the elastomer strip so obtained is clamped in the upper jaw of an Instron testing machine equipped to maintain a temperature of 140° C. and the freed end of the cord is clamped in the lower jaw. The machine is then operated to separate the jaws and thereby strip the cord from the elastomer sheet continuously. The tension necessary to strip the cord from the elastomer sheet is determined and is reported in pounds tension per single end of cord.

*Fatigue measurement.*—Fatigue is measured by means of a Rotating Cyclic Stress Apparatus, the subject of U.S. Patent 2,595,069. A sample of the cords to be tested is treated with lubricant (if desired), dipped into the adhesive mixtures and heated in the same manner as was done to the cord in the strip adhesion test. Five cords are then placed in parallel along the length of and between two rubber strips (0.5 inch x 0.5 inch x 2.5 inches). The sandwich structure is then pressed at 150 p.s.i. at 150° C. for 1 hour. The structure is placed in the cyclic stress apparatus which subjects the cords and the rubber to repeated extensions and compressions. In the examples which follow, the samples are tested at room temperature for 24 hours at extensions of 11.7% and compressions of 7.2%, with the disks of the apparatus rotating at 2700 r.p.m. The structures are then removed from the instrument and soaked for 5 hours in n-heptane to swell and soften them. The cords are then easily removed and tested for strength in an Instron testing machine.

*Friction measurement.*—Friction is measured in accordance with the procedure shown by Fort and Olsen in Textile Research Journal, December 1961, page 1007 ff, "Boundary Friction of Textile Yarns." The method is summarized in this article under the heading "Experimental Procedure" for yarn-to-yarn friction, with the exception that the following changes in the apparatus (illustrated on p. 1008, ibid.) are made: Instead of the take-up roll being rotated, the cylinder containing the test yarn is rotated at 0.01 cm./sec.; the test strand is stationary and one end of it is loaded with the 30-gram weight; the remaining end is connected to the strain gauge instead of to the take-up roll as illustrated. Friction is calculated by the "belt" relation:

$$\frac{T_2}{T_1}=e^{f\theta}$$

wherein $T_1$ and $T_2$ are the input and output tensions respectively, $f$ is the friction coefficient and $\theta$ is the wrap angle in radians.

EXAMPLES

The invention is further illustrated by the following examples although they are not intended to be delimitative.

EXAMPLE I

This example illustrates the improved adhesion obtained with the product of the present invention as compared with products of the prior art.

A 250-denier/50-filament yarn bundle of linear polyethylene terephthalate having a tenacity of 4.3 grams per denier is woven to a 4-oz./yd.$^2$ (138-g./meter$^2$) sailcloth fabric and treated and tested exactly as shown above under Adhesion Measurement For Fabric. Sample 1 contains no lubricant; the others contain one of the following lubricant systems:

(2) Mineral oil (3) Dimethyl siloxane (4) 2% by weight aluminum stearate (2-micron particle size) in mineral oil (5) 2% by weight of the calcium salt of an equimolar mixture of mono-n-octyl phosphate and bis-n-octyl phosphate (2-micron particle size) in mineral oil (6) 2% by weight of aluminum stearate (2-micron particle size) in dimethyl polysiloxane (7) 2% by weight of the above calcium salt in dimethyl polysiloxane Adhesion results are as follows:

| Sample: | Adhesion | |
|---|---|---|
| | (Lbs./in. fabric width) | (Kg./cm. fabric width) |
| 1 | 25 | 4.5 |
| 2 | 17 | 3.1 |
| 3 | 18 | 3.2 |
| 4 | 37 | 6.6 |
| 5 | 23 | 4.1 |
| 6 | 60 | 10.8 |
| 7 | 49 | 8.8 |

The improved adhesion of fabrics comprised of cords of the present invention (Samples 6 and 7) in relation to products of the prior art (Samples 1–5) is clearly shown.

EXAMPLE II

This example further illustrates the acceptable level of adhesion obtained using the products of the present invention as compared with a product of the prior art.

An 1880-denier/384-filament 2-ply cord of linear polyethylene terephthalate having a tenacity of 7.2 grams per denier is prepared and treated exactly as shown above under Single-End Strip Adhesion (SESA) Measurement. Three samples are prepared. The first sample contains a finish of the prior art (commercially available polyethylene glycol di-2-ethyl hexoate), the second contains 1% by weight of a 10% dispersion of aluminum stearate (2-micron particle size) in dimethyl polysiloxane (narrow molecular weight distribution), and the third contains 1% by weight of a 10% dispersion of the calcium salt of an equimolar mixture of mono-n-octyl phosphate and bis-n-octyl phosphate (2-micron particle size) in dimethyl polysiloxane (broad molecular weight distribution).

The results of the adhesion test are as follows:

| Sample: | SESA Adhesion at 140° C. | |
|---|---|---|
| | (lbs./end) | (kg./end) |
| 1 | 3.0 | 1.4 |
| 2 | 2.4 | 1.1 |
| 3 | 3.4 | 1.5 |

The equivalent adhesion performance of the cords of the present invention (Samples 2 and 3), as compared to the product of the prior art (Sample 1) is clearly shown.

EXAMPLE III

This example illustrates the improved friction properties obtained with the product of the present invention as compared with the product of the prior art.

A 940-denier/192-filament yarn bundle of linear polyethylene terephthalate of 7.2 grams per denier tenacity is treated and tested exactly as shown above under Friction Measurement. Sample 1 contains no lubricant; the others contain the following lubricant systems:

(2) Dimethyl polysiloxane (narrow molecular weight distribution)

(3) 2% by weight aluminum stearate (2-micron particle size) in dimethyl polysiloxane (narrow molecular weight distribution)

(4) 2% by weight of the calcium salt of an equimolar mixture of mono-n-octyl phosphate and bis-n-octyl phosphate (2-micron particle size) in dimethyl polysiloxane (narrow molecular weight distribution)

(5) 2% by weight of the calcium salt used in 4 in methyl/phenyl polysiloxane (6) 2% by weight of the calcium salt used in 4 in dimethylpolysiloxane (broad molecular weight distribution)

Friction results are as follows:

| Sample: | Coefficient of friction (f) |
|---|---|
| 1 | 0.49 |
| 2 | 0.43 |
| 3 | 0.18 |
| 4 | 0.10 |
| 5 | 0.15 |
| 6 | 0.15 |

The low friction values obtained by the products of the present invention (Samples 3–6) as compared with samples of the prior art (Samples 1 and 2) are clearly shown.

EXAMPLE IV

This example illustrates the improved fatigue values of the product of the present invention as compared with the products of the prior art.

An 1880-denier/384-filament 2-ply linear polyethylene terephthalate cord of 7.2 grams per denier tenacity is prepared and treated exactly as shown above under Fatigue Measurement. Three samples are prepared. The first sample contains a finish of the prior art (commercially available polyethylene glycol di-2-ethyl hexoate), the second contains 1% by weight of a 10% dispersion of aluminum stearate (2-micron particle size) in dimethyl polysiloxane (narrow molecular weight distribution), the third contains 1% by weight of a 10% dispersion of the calcium salt of an equimolar mixture of mono-n-octyl phosphate and bis-n-octyl phosphate (2-micron particle size) in dimethyl polysiloxane (broad molecular weight distribution).

The results of the fatigue test are as follows:

| Sample: | Fatigue [1] |
|---|---|
| 1 | 20.3 |
| 2 | 10.9 |
| 3 | 10.1 |

[1] Fatigue values are expressed as percent loss in breaking tenacity after cyclic testing.

The improved fatigue values obtained by the products of the present invention (Samples 2 and 3) as compared to the product of the prior art (Sample 1) are clearly shown.

Another advantage is recognized in the cords of the present invention. Generally, high twist levels produce low fatigue values but low strength in cords and conversely, low twist produces high fatigue but high strength. Thus, to achieve better strength, cords may be given low twist. The cords of the present invention surprisingly show improved fatigue values at any reasonable twist level as compared to cords of the prior art. Thus, cords of low twist may be used in reinforcing elastomer structures to achieve high strength and not suffer severely from high fatigue. The following example shows that fatigue values of cords of the present invention are raised with the lower twist but to a significantly lower extent than fatigue values of cords of the prior art.

EXAMPLE V

An 840-denier/192-filament polyethylene terephthalate yarn bundle is treated with 1.2% of a lubricant composition consisting of 10% by weight of the calcium salt of an equimolar mixture of mono-n-octyl phosphate (2-micron particle size) in dimethyl polysiloxane. The yarn is twisted to 9 S turns/inch. Three ends of this are plied and twisted to 9 Z turns/inch. The cord is treated exactly as shown above under Fatigue Measurement, with the exception that the elastomer stock is of the following composition:

| Ingredients: | Parts by weight |
|---|---|
| Natural rubber—smoked sheet | 100 |
| Furnace black (fast-extrusion) | 25 |
| Zinc oxide | 15 |
| Stearic acid | 1 |
| Pine tar | 1 |
| Sulfur | 2.5 |
| Benzothiazylsulfide accelerator | 1.0 |
| Phenyl-β-naphthylamine antioxidant | 1.0 |
| Total | 146.5 |

Another test sample is prepared and treated in the same manner with the exception that the twist levels are 7.5 turns/inch.

As a control, each above preparation is repeated with the execption that the lubricant is commercially available polyethylene glycol di(2-ethyl hexanoate) which is a typical lubricant of the prior art.

The following table shows the improved fatigue values obtained with the cords of the present invention at two twist levels in comparison with cords of the prior art. It is shown that although fatigue values of the new cords increase with decreasing twist, the increase is significantly lower as compared to cords of the prior art.

| Test: | Fatigue [1] |
|---|---|
| 9.0 x 9.0 | 9.6 |
| 7.5 x 7.5 | 45 |
| Control: | |
| 9.0 x 9.0 | 15.7 |
| 7.5 x 7.5 | 77 |

[1] Fatigue values expressed as percent loss in breaking tenacity after cyclic testing.

DESCRIPTION OF PREFERRED EMBODIMENTS

The polysiloxanes of this invention can be produced by intermolecular condensation of the corresponding silanols which are formed from the halide or alkoxy intermediates by hydrolysis. Methods of producing such polysiloxanes are taught in U.S. Patent 2,471,850. The orthophosphoric acid salts of this invention are prepared by neutralizing with a base, such as calcium hydroxide, a partial ester made by reacting phosphorous pentoxide with a long chain aliphatic alcohol or a mixture of such alcohols.

The filaments of the present invention comprise any of the synthetic linear polyesters known in the art to be useful in such articles as textiles or for reinforcement purposes. These polymers are defined in the 1960 "Supplement to Book of ASTM Standards," part 10 at page 53. Some of the methods for producing these polymers are disclosed in United States Patent 2,465,319. For reinforcement purposes, the fiber is preferably polyethylene terephthalate of greater than 25 relative viscosity (as defined in U.S. Patent 3,216,187) and is processed in a manner giving very high tenacity, i.e., approximately 8 g.p.d. A useful process for producing high tenacity polyethylene terephthalate fibers is taught in U.S. Patent 3,216,187.

The lubricated tire cord of the present invention is produced by melt spinning a polyester into fibers, stretching, e.g. cold drawing them and coating them with a mixture comprising from approximately 1 to 25% and preferably about 8% by weight of said solid lubricant in said polysiloxane. The oiled filaments may contain from approximately 0.3 to 10% and preferably contain 1.2% by weight of said lubricant mixture. The lubricant is preferably applied by means of an applicator roll but spraying or other application techniques known in the art may be used. The lubricant is best applied to raw filaments but the filaments may contain a small amount, say less than 0.1% of finish fluid prior to lubricant application. If a pre-draw finish is applied to the yarn, one may find it necessary to extract the finish by means of a solvent prior to applying the new lubricant mixture.

The oiled filaments of the present invention may be used in the construction of vehicle tires and such is at this time their most important value. Standard methods of producing cord reinforced pneumatic tires may be used. One such method comprises applying a lubricant to zero twist polyester yarns, twisting them into cords, and applying an adhesive thereto which is capable of binding the cords to the rubber stocks. A good adhesive consists of a subcoat mixture of phenol-blocked diisocyanate mixed with a diepoxide. The adhesive-coated cords are then heated under tension and subsequently overlaid with a dispersion of resorcinol-formaldehyde-latex (RFL) adhesive and heated again. The cord is then pressed into a sheet of elastomeric compound and the entire structure is heated. Upon heating, the adhesive layers interact and bind the cord to the elastomer stock. Further descriptions of processes for adhering polyester cords to elastomers may be found in U.S. Patent 2,990,313, and U.S. Patent 2,902,398.

Products of the present invention offer the heretofore unattained advantage of the combination of low interfilament friction and corresponding low fatigue values, and the ability to be strongly adhered to elastomer stock. The elastomeric structures reinforced with the new oiled polyester cords are oustandingly resistant to early failure and enhance the known and desirable features of polyester cord reinforced pneumatic tires.

What is claimed is:

1. A linear polyester filament coated with from 0.3% to 10% by weight of said filament, of a lubricant comprising (a) a linear organopolysiloxane wherein each of the silicon substituents is selected from the group consisting of lower alkyl and aryl, and (b) finely divided particles ranging from 0.4 to 40 microns in diameter comprising from 1% to 25% of the lubricant selected from the group consisting of calcium dioctyl phosphate and an equimolar mixture of calcium mono-n-octyl phosphate and calcium di-n-octyl phosphate.

References Cited

UNITED STATES PATENTS

| 2,618,600 | 11/1952 | Moreton | 252—49.9 |
| 2,853,451 | 9/1958 | Fortess et al. | 117—139.5 |
| 3,039,895 | 6/1962 | Yuk | 117—139.5 |
| 3,341,451 | 9/1967 | Dziuba et al. | 252—8.6 |
| 3,377,181 | 4/1968 | Kamijo et al. | 252—8.6 |

FOREIGN PATENTS

| 578,165 | 6/1959 | Canada. |

DONALD E. CZAJA, Primary Examiner

R. W. GRIFFIN, Assistant Examiner

U.S. Cl. X.R.

117—139.5, 161; 152—359; 161—175; 260—30.6, 824